US012479726B2

(12) United States Patent
Huang et al.

(10) Patent No.: US 12,479,726 B2
(45) Date of Patent: Nov. 25, 2025

(54) METHOD FOR THE HIGH EFFICIENCY RECYCLING OF IRON PHOSPHATE BLACK POWDER SLAG

(71) Applicants: Robert Brian Huang, Las Vegas, NV (US); Richard Brian Huang, Las Vegas, NV (US)

(72) Inventors: Robert Brian Huang, Las Vegas, NV (US); Richard Brian Huang, Las Vegas, NV (US)

(*) Notice: Subject to any disclaimer, the term of this patent is extended or adjusted under 35 U.S.C. 154(b) by 487 days.

(21) Appl. No.: 18/074,501

(22) Filed: Dec. 4, 2022

(65) Prior Publication Data

US 2024/0182304 A1   Jun. 6, 2024

(51) Int. Cl.
| | |
|---|---|
| C01B 25/37 | (2006.01) |
| B01J 20/06 | (2006.01) |
| C01B 25/30 | (2006.01) |
| C01B 25/36 | (2006.01) |
| C22B 7/04 | (2006.01) |
| C22B 21/00 | (2006.01) |
| C22B 21/04 | (2006.01) |
| C22B 26/12 | (2006.01) |
| H01M 10/54 | (2006.01) |

(52) U.S. Cl.
CPC ............. *C01B 25/375* (2013.01); *B01J 20/06* (2013.01); *C01B 25/303* (2013.01); *C01B 25/36* (2013.01); *C22B 7/04* (2013.01); *C22B 21/0023* (2013.01); *C22B 21/04* (2013.01); *C22B 26/12* (2013.01); *H01M 10/54* (2013.01)

(58) Field of Classification Search
CPC ..... C01B 25/375; C01B 25/303; C01B 25/36; B01J 20/06; C22B 7/04; C22B 21/0023; C22B 21/04; C22B 26/12; H01M 10/54
See application file for complete search history.

(56) References Cited

U.S. PATENT DOCUMENTS

2018/0133619 A1* 5/2018 Snydacker ............. B01J 47/018

FOREIGN PATENT DOCUMENTS

| EP | 4269336 A1 * | 11/2023 | ............ C01B 25/306 |
|---|---|---|---|
| WO | WO-2022142583 A1 * | 7/2022 | ............ C01B 25/306 |

* cited by examiner

*Primary Examiner* — Anthony J Zimmer

(57) ABSTRACT

This method recycles iron phosphate slag, which is produced as waste during lithium iron phosphate battery recycling processes that contain leaching or crushing for the sole extraction of lithium. This method extracts aluminum phosphate, iron phosphate, and lithium phosphate from the waste slag. The recycling process comprises these steps: (a) extraction of aluminum phosphate through addition of sodium hydroxide; (b) removal of carbon additives, graphite and other organic compounds through solvation of solely lithium, iron, and phosphate compounds through addition of sulfuric acid; (c) precipitation of iron phosphate by addition of hydrogen peroxide; (d) extraction of lithium phosphate from the mother liquor; (e) recycling of mother liquor into water and sodium sulfate. This process wastes few chemicals while still having a high reclamation efficiency in terms of purity and quantity. Furthermore, due to its relatively low costs, the profit margin of this process is very good.

19 Claims, 3 Drawing Sheets

Fig. 2

| | Tests | | Ideal Value | Recorded Value | Test instrument or method |
|---|---|---|---|---|---|
| Physical properties | BET (m²/g) | | 4~10 | 7.3 | Quadrasorb SI |
| | Tap density (g/cm³) | | >0.6 | 0.98 | Vibrating densimeter |
| | Particle size (μm) | D10 | >0.3 | 1.59 | Marvin Mastersizer 3000 |
| | | D50 | <10 | 5.7 | |
| | | D90 | <50 | 40.1 | |
| | pH | | 2.80~3.50 | 3.11 | pH meter |
| | Magnetic material (ppm) | | <1 | 0.11 | ICP |
| Chemical properties | Fe (%) | | 36.00~36.80 | 36.38 | Dichromate titration |
| | P (%) | | 20.60~20.90 | 20.86 | Gazalcitone gravimetric method |
| | Fe : P | | 0.960~0.98 | 0.968 | / |
| | Moisture (%) | | <0.5 | 0.28 | Gravimetric method |
| | Ti(ppm) | | <2000 | 950 | ICP, Carbon and Sulfide Analyzer, etc |
| | Mg (ppm) | | <150 | 46 | |
| | Mn(ppm) | | <300 | 143 | |
| | Na(ppm) | | <200 | 121 | |
| | Zn (ppm) | | <60 | 28 | |
| | Ni( ppm) | | <10 | 9 | |
| | Cu (ppm) | | <20 | 3 | |
| | Cr (ppm) | | <30 | 12 | |
| | Ca( ppm) | | <50 | 18 | |
| | S( ppm) | | <600 | 190 | High frequency infrared |

METHOD FOR THE HIGH EFFICIENCY RECYCLING OF IRON PHOSPHATE BLACK POWDER SLAG

TECHNICAL FIELD

The present invention relates to the field of chemical processing technology, in particular to the recycling of lithium iron phosphate battery materials, in particular to the recycling of the waste material of iron phosphate slag.

BACKGROUND

In recent decades, lithium ion batteries have gained widespread popularity as a method of energy storage, providing high capacity, high voltage, high power, long life cycle, high performance, thermally stable batteries that have found common use in both grid energy storage, small devices (such as cell phones), and large devices (such as electric vehicles). In particular, batteries containing lithium iron phosphate ($LiFePO_4$, henceforth abbreviated as LFP) cathodes have demonstrated to be extremely safe and have a long cycle life when compared to other cathode types, resulting in their increased participation and demand in technological developments. Due to this demand, it is expected that there will be significant amounts of waste LFP batteries in the future.

Current viable large-scale processes to recycle the materials within LFP generally produce a significant amount of other waste products. This is due to these processes using reactions or mechanisms to extract primarily the valuable lithium, foregoing the other compounds and subsequently producing an indistinguishable slag of the other materials. Often, carefully separating through such a slag is economically profitless. One current viable large-scale process to recycle the materials within LFP batteries is the hydrometallurgical process of acid leach, whereby battery components are dissolved in an acid and filtered to obtain desired materials. This filtering can be done either with additional solvents, a mesh screen, or a combination of both.

However, these processes generally produce significant chemical waste, as unwanted or unreclaimable materials or solvents are left within the acid or other solvents. Other common processes involve crushing the LFP batteries. However, this makes the extraction of other battery components, such as the current collectors, shell material, or electrolyte, more difficult. As a result, a slag of a mix of battery components is ejected during or at the end of these processes as well, which, if thrown away, is detrimental to the environment.

The composition of such slag differs depending on the processes. Generally they have a high concentration of iron phosphate, aluminum, and carbon compounds while containing small concentrations of LFP material that was not initially fully extracted. It is estimated that well over 100,000 tons of this desired slag will be produced each year, with current markets valuing such materials from $30-$80 per ton. With its component iron phosphate and aluminum compounds already worth more than $500 per ton, the slag, once separated, can produce gross profits well over 50%. Current methods for processing the slag generally have two main problems. The first is that existing methods cannot extract aluminum to an economically beneficial degree. The aluminum yield is low, which results not only in fewer profits from selling aluminum, but also, since the resulting iron phosphate or other extracted materials have high aluminum impurities (on the order of 1000-2000 ppm), the other materials are significantly devalued. The second problem is that existing methods extract, at best, around 90% of the iron phosphate, and they extract essentially none of the residual lithium material present in the slag (~0.1-1% by mass). Increasing these yields would further promote the economic feasibility of processing this waste product. Therefore, there is a significant economic and environmental opportunity in a cost effective method capable of extracting highly pure components of lithium, iron phosphate, and aluminum from the slag material that is produced as waste by LFP recycling processes.

SUMMARY

The purpose of the present disclosure is to provide a method for the recycling of iron phosphate slag, which is commonly produced as waste during lithium iron phosphate battery recycling processes that contain leaching and/or crushing for the sole extraction of the lithium element. The disclosed method solves three primary technical problems in the prior art, namely that the aluminum metal is not extracted to an economically beneficial degree, the residual lithium is not extracted, and a good amount of iron phosphate is left in the slag.

The technical details of the disclosure are described as follows.

A method for the recycling of iron phosphate slag, comprising the following sequential steps:

(S1) Mix iron phosphate slag, sodium hydroxide, and water to solvate the aluminum present in the slag as sodium aluminum oxide. Filter the solution to remove the solid slag (the solid slag of which is characterized primarily by iron phosphate, lithium compounds, and carbon, and henceforth known as Soli-1) from the filtrate (the filtrate of which is characterized primarily by sodium aluminum oxide, and henceforth known as Solu-1). Mix phosphoric acid with Solu-1 to precipitate aluminum phosphate. Filter the solution to extract the aluminum phosphate from the filtrate (the filtrate of which is characterized primarily by phosphate compounds with very little lithium compounds, and henceforth known as Solu-2).

(S2) Mix Soli-1, sulfuric acid, and water to solvate the lithium, iron, and phosphate compounds. Filter the solution to remove the solid slag (carbon slag) from the filtrate (the filtrate of which is characterized primarily by lithium sulfate, iron sulfate, and phosphoric acid, and henceforth known as Solu-3).

(S3) Mix Solu-2, Solu-3, and hydrogen peroxide to precipitate iron phosphate. Filter the solution to remove the impure iron phosphate from the filtrate (the filtrate of which is characterized primarily by lithium sulfate, and henceforth known as Solu-4). Mix the impure iron phosphate with a low concentration solution of phosphoric acid. Filter the solution to remove the iron phosphate from the filtrate. Add the filtrate to Solu-4. Then, wash the iron phosphate by mixing it with water and filtering the solution to extract the wet iron phosphate. Dry the iron phosphate in an air atmosphere before calcining it at a high temperature. Finally, crush and sieve the iron phosphate.

(S4) Mix Solu-4 with sodium hydroxide to precipitate unreacted slag waste. Filter the solution to remove the unreacted slag waste from the lithium sulfate solution. Place a lithium adsorbent into the lithium sulfate solution to extract lithium ions onto the adsorbent. Take the adsorbent out of the solution (the solution of which is characterized primarily by sulfate compounds, and henceforth known as Solu-5) and place it into a high concentration of sulfuric acid to solvate the lithium ions into lithium sulfate. Mix sodium phosphate with the lithium sulfate solution to precipitate lithium phosphate. Filter the solution to remove the lithium phosphate from the filtrate (the filtrate of which is characterized primarily by sodium sulfate, and henceforth known as Solu-6). Finally, dry the lithium phosphate in an air atmosphere.

(S5) Mix Solu-5 and Solu-6 and feed the solution into a mechanical vapor recompression (MVR) system. Finally, centrifuge and dry any recovered solid materials in an air atmosphere to extract sodium sulfate.

Preferably, in step S1, sodium hydroxide and water is mixed with the slag such that the resulting solution's pH is 8-11 and its liquid mass percentage content is 30-80%.

In an embodiment, when conducting a filtering step, a machine or tool is used primarily to separate the solid material in a solution from the liquid portion or to separate the liquid portion of a solution from the solid material.

In an embodiment, each filtering step is replaced by two or more sequential filtering steps, whereby the filtrates from a preceding step are sequentially fed into a subsequent filtering step. During these multiple steps, only the final filtrate is collected, while the residual solids from each step are collated.

Preferably, each mixing step is performed at 30° C.-60° C. under rapid stirring for at least 1 min.

Preferably, in step S1, phosphoric acid is added to the sodium aluminum oxide solution to control the pH to 4.5-5.5.

Preferably, in step S2, sulfuric acid and water is mixed with the slag such that the resulting solution's pH is 3-4 and its liquid mass percentage content is 30-80%.

Preferably, in step S3, hydrogen peroxide is added to Solu-3 to control the pH to 1.3-1.7.

In an embodiment, in step S3, an aging step is performed directly after mixing Solu-2, Solu-3, and hydrogen peroxide to precipitate iron phosphate. This aging step may utilize one or multiple stirring, heating, and/or cooling steps. The aging step should take no more than 5 hours to precipitate the iron phosphate.

Preferably, in step S3, the low concentration phosphoric acid has a concentration between 0.05M-0.3M and has an overall mass equal to 50%-200% of the impure iron phosphate's mass.

Preferably, in step S3, the water used to wash the iron phosphate has an overall mass equal to 50%-200% of the iron phosphate's mass.

In an embodiment, in step S3, the iron phosphate washing with water step (wherein the iron phosphate is mixed with water and the resulting solution is filtered to extract the wet iron phosphate) is either not performed, or is performed multiple times, whereby the resulting wet iron phosphate after a preceding washing step is fed into the subsequent step as the next step's iron phosphate.

Preferably, in step S3, S4, and S5, during drying steps, the material is dried at 100° C.-200° ° C. for 1 to 24 hours.

Preferably, in step S3, the iron phosphate is calcined at 350-550° C. for 1-9 hours.

In an embodiment, in step S3, the crushing and sieving can be replaced by two or more sequential grinding or milling steps, whereby, in a step, a machine or tool is used primarily to evenly or unevenly apply force to the iron phosphate such that the material either becomes smaller or has less and smaller clumps.

Preferably, in step S4, sodium hydroxide is added to Solu-4 to control the pH to 7-8.

Preferably, in step S4, the lithium adsorbent is one or a combination of cellulose nanocrystals, lithium ion sieve, lithium manganese oxide, lithium titanium oxide, hydrogen titanium oxide, and hydrogen manganese oxide.

Preferably, in step S4, the mass of the lithium adsorbent is 2% to 20% of the mass of the lithium sulfate solution.

Preferably, in step S4, the adsorption process takes 15 minutes to 5 hours.

Preferably, in step S4, the high concentration sulfuric acid has a concentration between 0.5M-3M and has an overall mass equal to 10%-100% of the adsorbent's mass.

Preferably, in step S4, the desorption process takes 15 minutes to 5 hours.

Preferably, in step S4, the sodium phosphate has a mass equal to 5%-50% of the adsorbent's mass.

In an embodiment, in step S2, Solu-2 is thrown away as waste or recycled directly in an MVR system and not later mixed with Solu-3 and hydrogen peroxide in step S3.

In an embodiment, in step S3, the filtrate, produced after filtering the low concentration phosphoric acid and iron phosphate solution, is thrown away as waste or recycled directly in an MVR system, and is not mixed with Solu-4.

In an embodiment, in step S4, Solu-5 is thrown away as waste or recycled directly in an MVR system and not later mixed with Solu-6 in step S5.

Overall, the method produces four valuable compounds—aluminum phosphate, iron phosphate, lithium phosphate, and sodium sulfate—and produces carbon slag as waste. Because aluminum is immediately and specifically targeted with sodium hydroxide and extracted, the final products each have far lower aluminum impurities than prior art.

In addition, the method successfully extracts lithium ions from the slag by utilizing an adsorbent.

Finally, because the iron phosphate is extracted after both the aluminum and carbon slag have been removed from the solution, when iron phosphate precipitates, there are fewer impurities to interrupt its crystal formation within the solution. Overall this increases iron phosphate's yield.

BRIEF DESCRIPTION OF THE DRAWINGS

FIG. 2 is a table for various physical and chemical properties of the iron phosphate extracted according to an embodiment of the present invention (Embodiment 1).

DETAILED DESCRIPTION OF EMBODIMENTS

Figure 1:
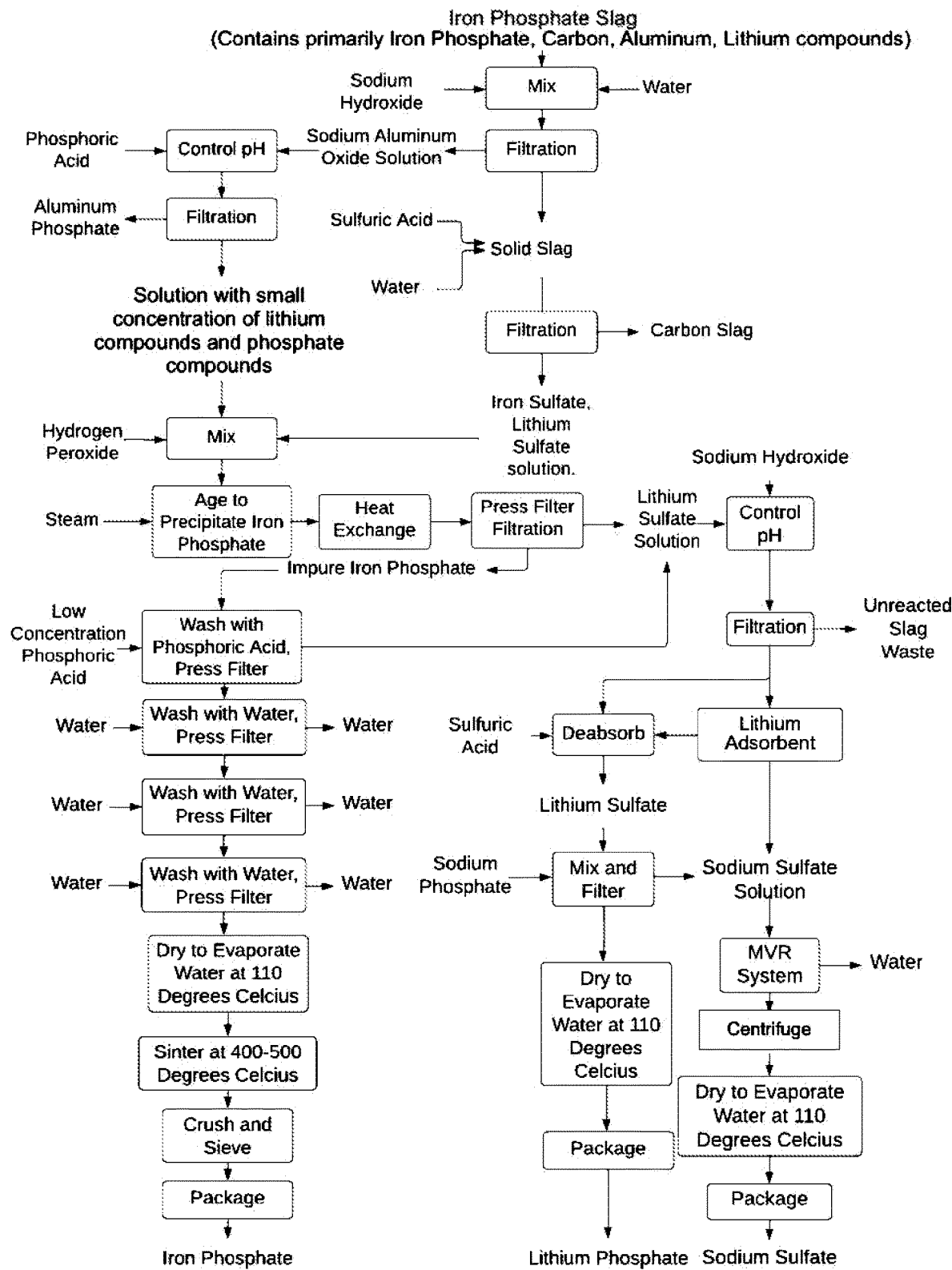
FIG. 1 is a flow chart of the recycling method of the iron phosphate slag material in one embodiment.
Figure 3:
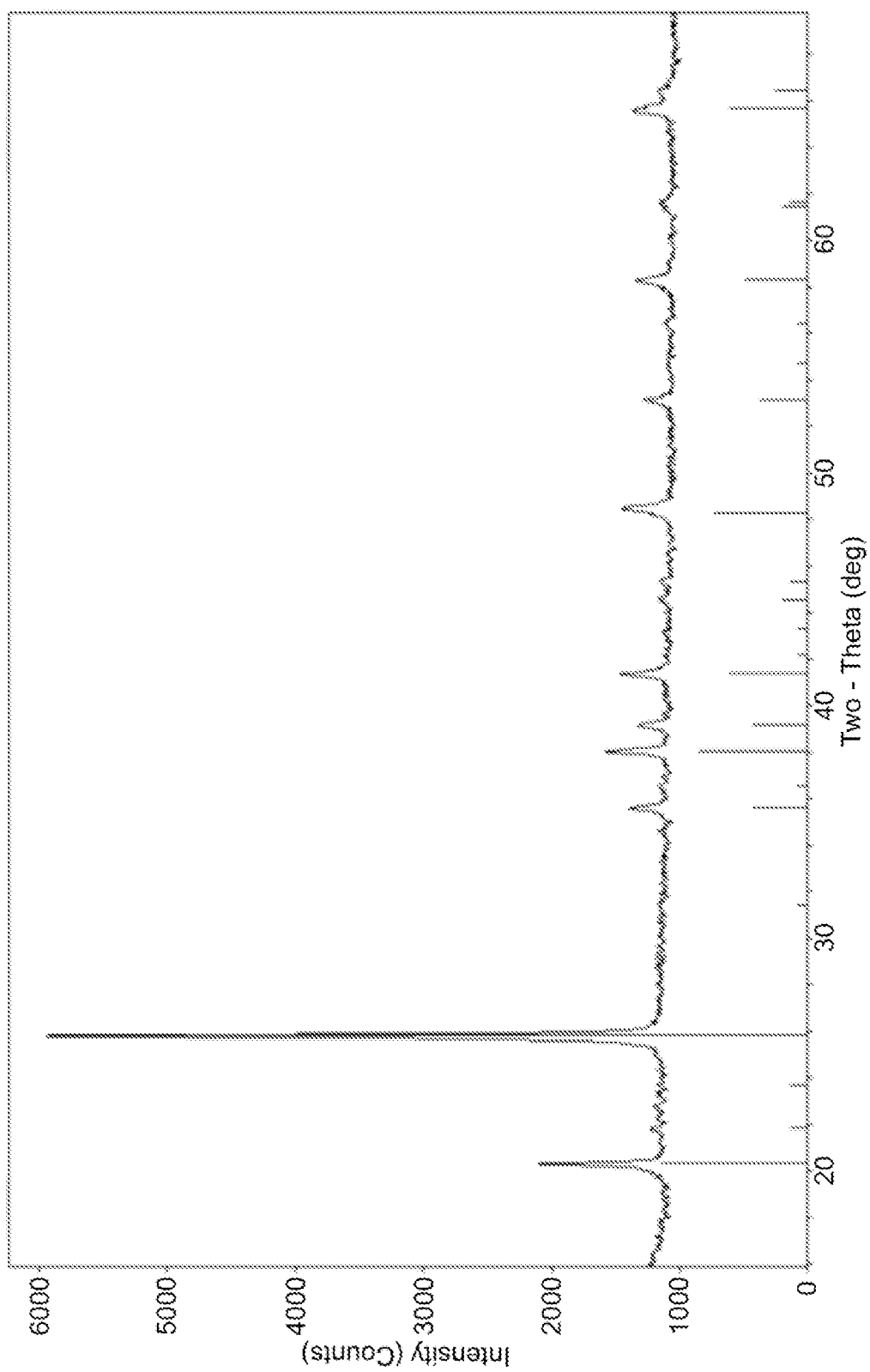
FIG. 3 is an X-ray diffraction (XRD) pattern of the iron phosphate extracted according to an embodiment of the present invention (Embodiment 1).

In order to promote the understanding of the present disclosure, the disclosure will be described below in detail, with reference to the preferred embodiment. It should be understood that the embodiment is merely illustrative, and is not intended to limit the scope of the present disclosure. Any changes, modifications and replacements made by those skilled in the art without departing from the spirit of the disclosure should fall within the scope of the disclosure defined by the appended claims.

The instruments used in the following embodiments include: a sanding machine (model SX-200, manufactured by Wuxi Xiguang Powder Technology Co., LTD); a spray dryer (model LP-12, manufactured by Shanghai Gaoling Technology Development Co., LTD); a tube box furnace (model OTL1200-11, manufactured by Anhui Hefei Hengli Electronic Equipment Company); an air box furnace (model HXL004-12, manufactured by Anhui Hefei Hengli Electronic Equipment Company).

Embodiment 1

Iron phosphate slag was obtained from Weijin recycling technology limited.
- (S1) 200 g of iron phosphate slag, 100 mL of 1M sodium hydroxide, and 500 mL of deionized water were mixed at 40° C. for 30 min under rapid stirring. The solution was then press filtered. Phosphoric acid was mixed with the resulting sodium aluminum oxide solution at 40° C. for 30 min under rapid stirring until the solution's pH was ~5.2 to precipitate aluminum phosphate. The solution was then press filtered to extract the aluminum phosphate from the filtrate.
- (S2) The solid that was obtained after the first filtration in S1 was mixed with 100 mL of 1M sulfuric acid and 500 ml of water at 40° C. for 30 min under rapid stirring. The solution was press filtered and the solid slag obtained was collected as waste.
- (S3) The filtrate resulting from S2, the resulting filtrate from S1, and 100 mL of 1M hydrogen peroxide were mixed at 40° C. for 45 min under rapid stirring until the solution's pH was 1.3~1.7. The resulting solution was aged at 60° C. for 1 hour and then press filtered (Solu-4). The impure iron phosphate and 200 ml of 0.1M phosphoric acid were mixed at 40° C. for 20 min under rapid stirring. The solution was then filtered, and the filtrate was added to Solu-4. The resulting iron phosphate and 200 mL of deionized water were mixed at 40° ° C. for 20 min under rapid stirring. The solution was then filtered. The iron phosphate was washed with water twice more in this fashion. The iron phosphate was dried at 110° C. in an air atmosphere for 3 hours before it was calcined at a high temperature of 450° C. for 3 hours. Finally, the iron phosphate was crushed and fed through a 200 um sieve.
- (S4) Solu-4 and 100 mL of 1M sodium hydroxide were mixed at 40° C. for 15 min under rapid stirring until the solution's pH was 7.5. The solution was press filtered, and the resulting solid slag was collected from the filtrate (Solu-5). 75 g of hydrogen titanium oxide was put into Solu-5 for 2 hours. The adsorbent was then taken out of Solu-5 and placed into 80 mL of 2M sulfuric acid for 2 hours. The adsorbent was then taken out. 15 g of sodium phosphate was mixed into the resulting lithium sulfate solution at 40° C. for 15 min under rapid stirring. The solution was then filtered to extract the lithium phosphate from the filtrate (Solu-6). Finally, the lithium phosphate was dried at 110° C. in an air atmosphere for 3 hours.
- (S5) Solu-5 and Solu-6 were mixed at 40° ° C. for 10 min under rapid stirring and fed into a MVR system. The remaining solid material was centrifuged and dried at 110° C. in an air atmosphere for 3 hours.

At the end of the process, 100.5 g of iron phosphate (99.5% in purity), 11 g of aluminum phosphate (99.0% purity), 2.16 g of lithium phosphate, and 38.7 g of sodium sulfate (95% purity) were extracted. The iron phosphate product was analyzed with various techniques, including X-ray diffraction spectroscopy, which all indicated overall high purity.

As shown in the example, this method is capable of retrieving significant amounts of aluminum and lithium from the iron phosphate slag. Furthermore, yield of iron phosphate is both higher than prior art and is more pure. In particular, it contains less aluminum.

The invention claimed is:

1. A method for recycling iron phosphate slag, comprising the following sequential steps:
- (S1) extracting aluminum phosphate in the iron phosphate slag by sequentially:
  - a) mixing iron phosphate slag, sodium hydroxide, and water to solvate aluminum present in the iron phosphate slag as sodium aluminum oxide and produce a solid slag;
  - b) filtering the resulting solution of a) to remove the solid slag in the solution wherein the solid slag comprises iron phosphate, lithium compounds, and carbon and is designated Soli-1, from the resulting filtrate wherein the filtrate comprises sodium aluminum oxide and is designated Solu-1;
  - c) mixing Solu-1 and phosphoric acid to precipitate aluminum phosphate;
  - d) filtering the resulting solution of c) to extract the aluminum phosphate in the solution and produce a filtrate, wherein the filtrate comprises phosphate compounds and lithium compounds, and is designated Solu-2;
- (S2) removing carbon additives, graphite and other organic compounds by sequentially:
  - e) mixing Soli-1, sulfuric acid, and water to produce a solution with lithium, iron, and phosphate compounds and precipitate solid carbon slag;
  - f) filtering the resulting solution of e) to remove the solid carbon slag and produce a filtrate, wherein the filtrate comprises lithium sulfate, iron sulfate, and phosphoric acid, and is designated Solu-3;
- (S3) extracting iron phosphate by sequentially:
  - g) mixing Solu-2, Solu-3, and hydrogen peroxide to precipitate iron phosphate;
  - h) filtering the resulting solution of g) to extract impure iron phosphate and produce a filtrate, wherein the filtrate comprises lithium sulfate, and is designated Solu-4;
  - i) mixing the impure iron phosphate with a low concentration solution of phosphoric acid;
  - j) filtering the resulting solution of i) to extract iron phosphate and produce a filtrate, the filtrate of which is added to Solu-4;
  - k) optionally washing the extracted iron phosphate of j) by mixing the iron phosphate with water and filtering the resulting solution to extract less impure iron phosphate;
  - l) Subjecting the iron phosphate of j or the less impure iron phosphate k), if washed, to sequential drying in an air atmosphere, high-temperature calcination, and then either crushing and sieving, or alternatively grinding and milling;
- (S4) extracting lithium phosphate from Solu-4 by sequentially:
  - m) mixing Solu-4 and sodium hydroxide to precipitate unreacted slag waste;
  - n) filtering the resulting solution of m) to remove the unreacted slag waste and produce a lithium sulfate solution;
  - o) placing a lithium adsorbent into the resulting lithium sulfate solution of n) to extract lithium ions into or onto the adsorbent;

p) taking the adsorbent out of the solution, wherein the solution comprises sulfate compounds and is designated Solu-5, and placing the adsorbent into a high concentration of sulfuric acid to solvate the lithium ions into lithium sulfate;

q) mixing the resulting lithium sulfate solution of p) with sodium phosphate to precipitate lithium phosphate;

r) filtering the resulting solution of q) to obtain lithium phosphate and produce a filtrate, wherein the filtrate comprises sodium sulfate, and is designated Solu-6;

s) drying the lithium phosphate in an air atmosphere;

(S5) Recycling Solu-5 and Solu-6 into water and sodium sulfate by sequentially:

t) mixing Solu-5 and Solu-6 and feeding the resulting solution into a mechanical vapor recompression (MVR) system;

u) centrifuging and drying any recovered solid materials from t) in an air atmosphere to extract sodium sulfate.

2. The method for recycling iron phosphate slag of claim 1, wherein, in step S1 (a), sodium hydroxide and water are mixed with the iron phosphate slag such that the resulting solution has a pH of 8-10 and a liquid mass percentage content of 30-80%.

3. The method for recycling iron phosphate slag of claim 1, wherein, whenever a filtering step is conducted, a machine or tool is used to separate the solid material in a solution from the liquid portion or to separate the liquid portion of a solution from the solid material.

4. The method for recycling iron phosphate slag of claim 1, wherein, whenever a filtering step is conducted, the step further comprises two or more sequential filtering steps, whereby the filtrate solution from a preceding step is sequentially fed into a subsequent filtering step and, during these multiple steps, the residual solids from each step are collected and combined while only the filtrate solution from the final step is collected.

5. The method for recycling iron phosphate slag of claim 1, wherein each mixing step is performed at 30° C.-80° C. under stirring for at least 1 min.

6. The method for recycling iron phosphate slag of claim 1, wherein, in step S1 (c), phosphoric acid is added to Solu-1 to control the pH to 4.5-5.5.

7. The method for recycling iron phosphate slag of claim 1, wherein, in step S2 (e), sulfuric acid and water are mixed with the Soli-1 such that the resulting solution's pH is 3-4 and its liquid mass percentage content is 30-80%.

8. The method for recycling iron phosphate slag of claim 1, wherein, in step S3 (g), hydrogen peroxide is added to Solu-3 to control the pH to 1.3-1.7.

9. The method for recycling iron phosphate slag of claim 1, wherein, in step S3, an aging step is performed directly after (g) mixing Solu-2, Solu-3, and hydrogen peroxide to precipitate iron phosphate; this aging step of which may utilize a stirring, heating, or cooling step, or a combination of one or multiple stirring, heating and cooling steps, but the overall aging step takes no more than 5 hours to precipitate the iron phosphate.

10. The method for recycling iron phosphate slag of claim 1, wherein, in step S3 (i), the low concentration phosphoric acid has a concentration between 0.05M-0.3M and has an overall mass equal to 50%-200% of the impure iron phosphate's mass.

11. The method for recycling iron phosphate slag of claim 1, wherein, in step S3 (k), the optional washing step is performed, or is performed multiple times, whereby the resulting wet iron phosphate after a preceding washing step is fed into the subsequent step as the next step's iron phosphate.

12. The method for recycling iron phosphate slag of claim 1, wherein, in step S3, S4, and S5, during drying steps (l), (s), and (u), the material is dried at 100° C.-200° C. for 1 to 24 hours.

13. The method for recycling iron phosphate slag of claim 1, wherein, in step S3 (l), the iron phosphate is calcined at 350-550° C. for 1 to 9 hours.

14. The method for recycling iron phosphate slag of claim 1, wherein, in step S3 (l), the crushing and sieving or alternatively grinding and milling further comprises one or more sequential crushing and sieving or alternatively grinding and milling steps wherein, in each step, a machine or tool applies force to the iron phosphate such that the material is reduced in particle size and/or clump size.

15. The method for recycling iron phosphate slag of claim 1, wherein, in step S4 (m), sodium hydroxide is added to Solu-4 to control the pH to 7-8.

16. The method for recycling iron phosphate slag of claim 1, wherein, in step S4 (o), the lithium adsorbent is one or a combination of cellulose nanocrystal, lithium ion sieve, lithium manganese oxide, lithium titanium oxide, hydrogen titanium oxide, and hydrogen manganese oxide, wherein the mass of the lithium adsorbent is 2% to 20% of the mass of the lithium sulfate solution and the adsorption process takes 15 minutes to 5 hours.

17. The method for recycling iron phosphate slag of claim 1, wherein, in step S4 (p), the high concentration sulfuric acid has a concentration between 0.5M-3M and has an overall mass equal to 10%-100% of the adsorbent's mass, and the adsorbent is placed into the high concentration sulfuric acid for 15 minutes to 5 hours.

18. The method for recycling iron phosphate slag of claim 1, wherein, in step S4 (q), the sodium phosphate has a mass equal to 5%-50% of the adsorbent's mass.

19. The method for recycling iron phosphate slag of claim 1, wherein one of or a combination of Solu-2, the filtrate produced after filtering the low concentration phosphoric acid and iron phosphate solution in step S3, and Solu-5 is thrown away as waste or recycled directly in an MVR system and not later mixed with any of Solu-3, Solu-4, or Solu-6.

* * * * *